(12) United States Patent
Uchida et al.

(10) Patent No.: US 10,309,761 B2
(45) Date of Patent: Jun. 4, 2019

(54) ANGLE SENSOR SYSTEM

(71) Applicant: TDK Corporation, Tokyo (JP)

(72) Inventors: Keisuke Uchida, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/883,226

(22) Filed: Jan. 30, 2018

(65) Prior Publication Data

US 2018/0274898 A1 Sep. 27, 2018

(30) Foreign Application Priority Data

Mar. 24, 2017 (JP) ................................. 2017-059292

(51) Int. Cl.
| | |
|---|---|
| *G01B 7/14* | (2006.01) |
| *G01D 5/14* | (2006.01) |
| *G01R 33/09* | (2006.01) |
| *G01B 7/30* | (2006.01) |
| *G01D 5/16* | (2006.01) |
| G01D 5/244 | (2006.01) |
| G01D 3/02 | (2006.01) |

(52) U.S. Cl.
CPC ............... *G01B 7/30* (2013.01); *G01D 5/145* (2013.01); *G01D 5/16* (2013.01); *G01D 3/02* (2013.01); *G01D 5/24476* (2013.01)

(58) Field of Classification Search
CPC . G01D 5/14; G01D 5/16; G01D 5/244; G01B 7/14; G01B 7/30; G01R 33/09
See application file for complete search history.

(56) References Cited

U.S. PATENT DOCUMENTS

2011/0031965 A1* 2/2011 Saruki .................... G01D 3/036
324/207.25

FOREIGN PATENT DOCUMENTS

JP 2011-158488 A 8/2011

* cited by examiner

*Primary Examiner* — Neel D Shah
(74) *Attorney, Agent, or Firm* — Oliff PLC

(57) ABSTRACT

An angle sensor system includes a magnetic field generation unit for generating a rotating magnetic field, and an angle sensor for detecting the rotating magnetic field to generate a detected angle value. The rotating magnetic field contains first and second magnetic field components orthogonal to each other. Each of the first and second magnetic field components contains an ideal magnetic field component and an error magnetic field component. The error magnetic field component causes an angular error that varies with ½ the predetermined period. The angle sensor includes first and second detection signal generation units. Each of the first and second detection signal generation units includes a magnetic layer whose magnetization direction varies according to the direction of the rotating magnetic field. The magnetic layer is provided with a magnetic anisotropy that is set to reduce the angular error resulting from the error magnetic field component.

7 Claims, 11 Drawing Sheets

ANGLE SENSOR SYSTEM

BACKGROUND OF THE INVENTION

1. Field of the Invention

The present invention relates to an angle sensor system that includes a magnetic field generation unit and an angle sensor.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. An angle sensor system using a magnetic angle sensor is typically provided with a magnetic field generation unit for generating a rotating magnetic field whose direction rotates in response to the rotation or linear movement of an object. The magnetic field generation unit may be a magnet configured to rotate, for example. The angle to be detected by the magnetic angle sensor corresponds to the rotational position of the magnet, for example.

Among known magnetic angle sensors is one that includes a plurality of detection circuits for generating a plurality of detection signals of different phases and generates a detected angle value by performing computations using the plurality of detection signals, as disclosed in JP 2011-158488A. Each of the plurality of detection circuits includes at least one magnetic detection element. The magnetic detection element includes, for example, a spin-valve magnetoresistance element including a magnetization pinned layer whose magnetization direction is pinned, a free layer whose magnetization direction varies according to the direction of the rotating magnetic field, and a nonmagnetic layer located between the magnetization pinned layer and the free layer.

For the magnetic angle sensors, ideally, each of the plurality of detection signals has a waveform of a sinusoidal curve (including a sine waveform and a cosine waveform) when the angle to be detected varies with a predetermined period. However, there are cases where the waveform of each detection signal is distorted from a sinusoidal curve. A distortion of the waveform of each detection signal may result in some error in the detected angle value. The error occurring in the detected angle value will hereinafter be referred to as angular error.

When distorted in waveform, each detection signal contains an ideal component which varies in such a manner as to trace an ideal sinusoidal curve, and an error component other than the ideal component. A detected angle value that is calculated with each detection signal consisting only of the ideal component corresponds to a true angle to be detected by the angle sensor. Such a detected angle value will hereinafter be referred to as ideal angle. Angular error is the difference between the ideal angle and any detected angle value.

The causes of distortion of the waveform of each detection signal are broadly classified into a first cause related to the rotating magnetic field generated by the magnetic field generation unit and a second cause related to the magnetic detection element. In the case of an ideal angle sensor system, when the angle to be detected varies with a predetermined period, a waveform that represents variation in the strength of a component in one direction of the rotating magnetic field at the position of each detection circuit, which will hereinafter be referred to as a field-strength waveform, is sinusoidal, and the waveform of each detection signal generated by each detection circuit is also sinusoidal. The angular error caused by the first cause is due to distortion of the field-strength waveform from a sinusoidal curve.

The angular error caused by the second cause is due to distortion of the waveform of each detection signal from a sinusoidal curve even when the field-strength waveform is sinusoidal. The angular error caused by the second cause is also experienced when, for example, the free layer of a magneto resistance element serving as the magnetic detection element has a magnetic anisotropy. Angular error may also be caused by the combination of the first cause and the second cause.

JP 2011-158488A describes a magnetic sensor capable of reducing the angular error caused by the first cause. The magnetic sensor includes a first detection unit and a second detection unit located at positions different from each other. The first detection unit includes a first detection circuit, a second detection circuit, and a first computation circuit for calculating a first detection angle on the basis of output signals from the first and second detection circuits. The second detection unit includes a third detection circuit, a fourth detection circuit, and a second computation circuit for calculating a second detection angle on the basis of output signals from the third and fourth detection circuits. The magnetic sensor further includes a third computation circuit for calculating a detected angle value on the basis of the first and second detection angles.

The magnetic sensor described in JP 2011-158488A requires a large number of detection circuits and computation circuits, which makes the magnetic sensor complicated in configuration.

SUMMARY OF THE INVENTION

It is an object of the present invention to provide an angle sensor system that is simple in configuration and capable of reducing an angular error associated with a rotating magnetic field generated by a magnetic field generation unit.

An angle sensor system of the present invention includes a magnetic field generation unit and an angle sensor. The magnetic field generation unit generates a rotating magnetic field whose direction at a predetermined detection position varies according to an angle to be detected. The angle sensor detects the rotating magnetic field at the detection position and generates a detected angle value having a correspondence with the angle to be detected. The rotating magnetic field at the detection position contains a first magnetic field component in a first direction, and a second magnetic field component in a second direction orthogonal to the first direction.

The angle sensor includes a first detection signal generation unit, a second detection signal generation unit, and an angle detection unit The first detection signal generation unit generates a first detection signal having a correspondence with the cosine of an angle that the direction of the rotating magnetic field at the detection position forms with respect to the first direction. The second detection signal generation unit generates a second detection signal having a correspondence with the sine of the angle that the direction of the rotating magnetic field at the detection position forms with respect to the first direction. The angle detection unit generates the detected angle value on the basis of the first and second detection signals.

The first detection signal generation unit includes at least one first magnetic detection element. The at least one first magnetic detection element includes a first magnetic layer whose magnetization direction varies according to the direction of the rotating magnetic field at the detection position. The first magnetic layer is provided with a first magnetic anisotropy.

The second detection signal generation unit includes at least one second magnetic detection element. The at least one second magnetic detection element includes a second magnetic layer whose magnetization direction varies according to the direction of the rotating magnetic field at the detection position. The second magnetic layer is provided with a second magnetic anisotropy.

When the angle to be detected varies with a predetermined period, each of the first and second magnetic field components contains an ideal magnetic field component and an error magnetic field component, the ideal magnetic field component varying periodically in such a manner as to trace an ideal sinusoidal curve. The error magnetic field component causes an error that varies with ½ the predetermined period in the detected angle value.

Assuming that each of the first and second magnetic field components consists only of the ideal magnetic field component when the angle to be detected varies with the predetermined period, each of the first and second detection signals contains an ideal signal component and an error signal component, the ideal signal component varying periodically in such a manner as to trace an ideal sinusoidal curve. The error signal component results from the first and second magnetic anisotropies and causes an error that varies with ½ the predetermined period in the detected angle value.

In the angle sensor system of the present invention, the first and second magnetic anisotropies are set to allow the detected angle value to contain a reduced error that varies with ½ the predetermined period, as compared with both of the error that the error magnetic field component causes in the detected angle value and the error that the error signal component causes in the detected angle value.

In the angle sensor system of the present invention, the error that the error magnetic field component causes in the detected angle value and the error that the error signal component causes in the detected angle value may have a phase difference of 90°.

In the angle sensor system of the present invention, both of the first and second magnetic anisotropies may be shape magnetic anisotropies. An easy axis direction established by the first magnetic anisotropy and an easy axis direction established by the second magnetic anisotropy may be the same.

In the angle sensor system of the present invention, the at least one first magnetic detection element and the at least one second magnetic detection element may each include at least one magnetoresistance element.

In the angle sensor system of the present invention, the magnetic field generation unit may be a magnet that is rotatable about a central axis. In such a case, the detection position may be located off the central axis. The angle to be detected may correspond to the rotational position of the magnet.

In the angle sensor system of the present invention, the magnetic field generation unit may be a magnet including a plurality of pairs of N and S poles arranged alternately in the first direction. In such a case, the relative position of the magnet with respect to the detection position may be variable in the first direction. The angle to be detected may be an angle that represents the relative position of the magnet with respect to the detection position with one pitch of the magnet as 360°.

The angle sensor system of the present invention uses the first and second magnetic anisotropies to reduce the angular error occurring due to the error magnetic field component. The present invention thus enables reduction of the angular error associated with the rotating magnetic field generated by the magnetic field generation unit, without complexity in configuration.

Other and further objects, features and advantages of the present invention will appear more fully from the following description.

DETAILED DESCRIPTION OF THE PREFERRED EMBODIMENTS

First Embodiment

Figure 1:
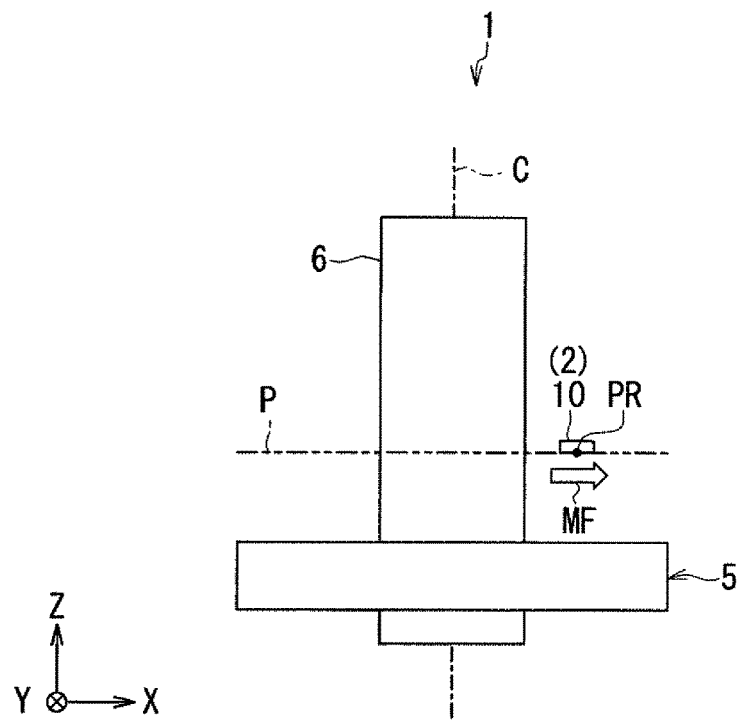
FIG. 1 is a side view illustrating the general configuration of an angle sensor system according to a first embodiment of the invention.
Figure 2:
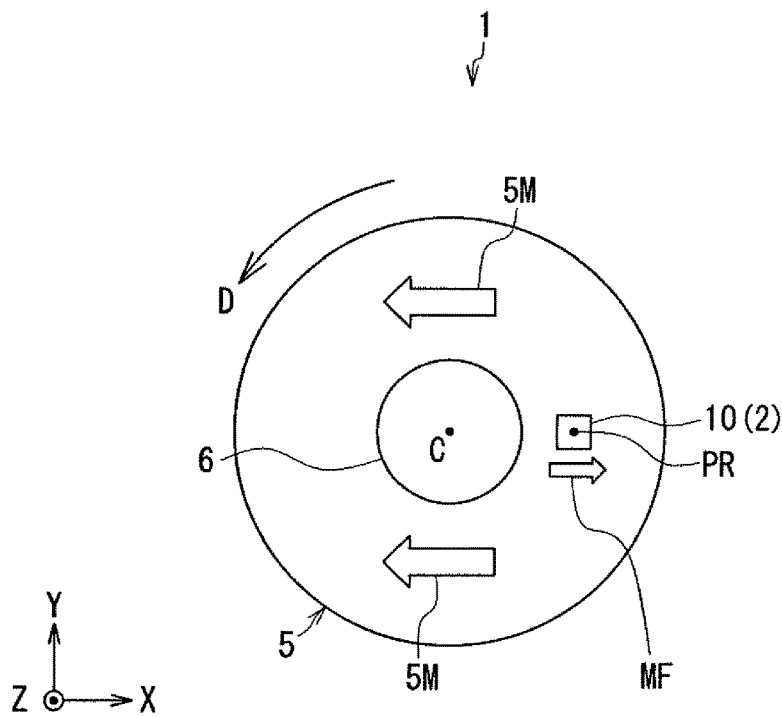
FIG. 2 is a plan view illustrating the general configuration of the angle sensor system according to the first embodiment of the invention.

Preferred embodiments of the present invention will now be described in detail with reference to the drawings. First, reference is made to FIG. 1 and FIG. 2 to describe the general configuration of an angle sensor system according to a first embodiment of the invention. FIG. 1 is a side view illustrating the general configuration of the angle sensor system according to the first embodiment. FIG. 2 is a plan view illustrating the general configuration of the angle sensor system according to the first embodiment. The angle sensor system 1 according to the first embodiment includes a magnetic field generation unit and an angle sensor 2.

The magnetic field generation unit of the present embodiment is a magnet 5 of a ring shape mounted onto a rotary shaft 6, which is an object whose rotational position is to be detected. In response to the rotation of the rotary shaft 6, the magnet 5 rotates about a central axis C in a rotational direction D. The angle to be detected in the present embodiment corresponds to the rotational position of the rotary shaft 6 and the rotational position of the magnet 5. Hereinafter, the angle to be detected will be referred to as "target angle" and represented by symbol θ.

The magnet 5 serving as the magnetic field generation unit has a magnetization in the direction indicated by arrows 5M in FIG. 2. With this magnetization, the magnet 5 generates a rotating magnetic field MF whose direction M a predetermined detection position PR varies according to the target angle θ. Hereinafter, the angle that the direction DM of the rotating magnetic field MF at the detection position PR forms with respect to a predetermined reference direction DR will be referred to as "rotating field angle" and represented by symbol θM.

The angle sensor 2 is a magnetic angle sensor, in particular. The angle sensor 2 detects the rotating magnetic field MF at the detection position PR and generates a detected angle value θs having a correspondence with the target angle θ.

The detection position PR is located in a reference plane P, which is an imaginary plane that is parallel to an end face of the magnet 5 and perpendicular to the central axis C. In the reference plane P, the direction DM of the rotating magnetic field MF rotates about the detection position PR. The reference direction DR is located in the reference plane P and intersects the detection position PR. In the following description, the direction DM of the rotating magnetic field MF at the detection position PR refers to a direction in the reference plane P.

The angle sensor 2 includes a detection unit 10 and an angle detection unit 20. The angle detection unit 20 is not shown in FIG. 1 or FIG. 2, bat shown in FIG. 4 to be described later. The detection unit 10 is situated to contact or intersect the reference plane P. The relative position of the magnet 5 with respect to the detection unit 10 varies in the rotational direction D about the central axis C.

Figure 3:
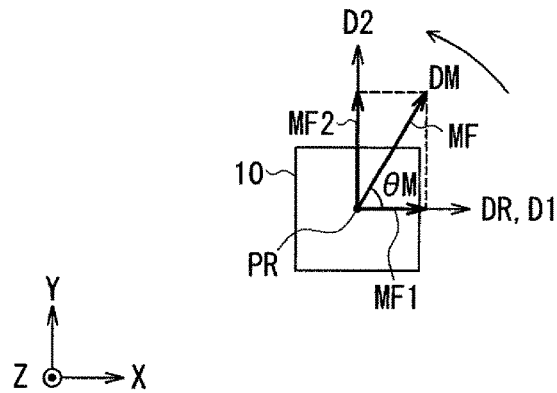
FIG. 3 is an explanatory diagram illustrating the definitions of directions and angles used in the first embodiment of the invention.

Now, the definitions of directions and angles used in the present embodiment will be described with reference to FIGS. 1 to 3. First, Z direction is the direction parallel to the central axis C shown in FIG. 1 and upward in FIG. 1. In. FIGS. 2 and 3, the Z direction is out of the plane of the drawing. Next, X and Y directions are two directions that are perpendicular to the Z direction and orthogonal to each other. In FIG. 1, the X direction is rightward, and the Y direction is into the plane of the drawing. In FIGS. 2 and 3, the X direction is rightward, and the Y direction is upward. Further, −X direction is the direction opposite to the X direction, and −Y direction is the direction opposite to the Y direction.

The detection position PR is the position at which the angle sensor 2 detects the rotating magnetic field MF. The reference direction DR is the X direction. The direction DM of the rotating magnetic field MF rotates counterclockwise in FIG. 3. The target angle θ and the rotating field angle θM will be expressed in positive values when seen counterclockwise from the reference direction DR, and in negative values when seen clockwise from the reference direction DR.

A first direction D1 and a second direction D2 refer to two directions orthogonal to each other in the reference plane P. In the present embodiment, the first direction D1 is the X direction, and the second direction D2 is the Y direction.

As shown in FIG. 3, the rotating magnetic field MF at the detection position PR contains a first magnetic field component MF1 in the first direction D1 and a second magnetic field component MF2 in the second direction D2.

Figure 4:
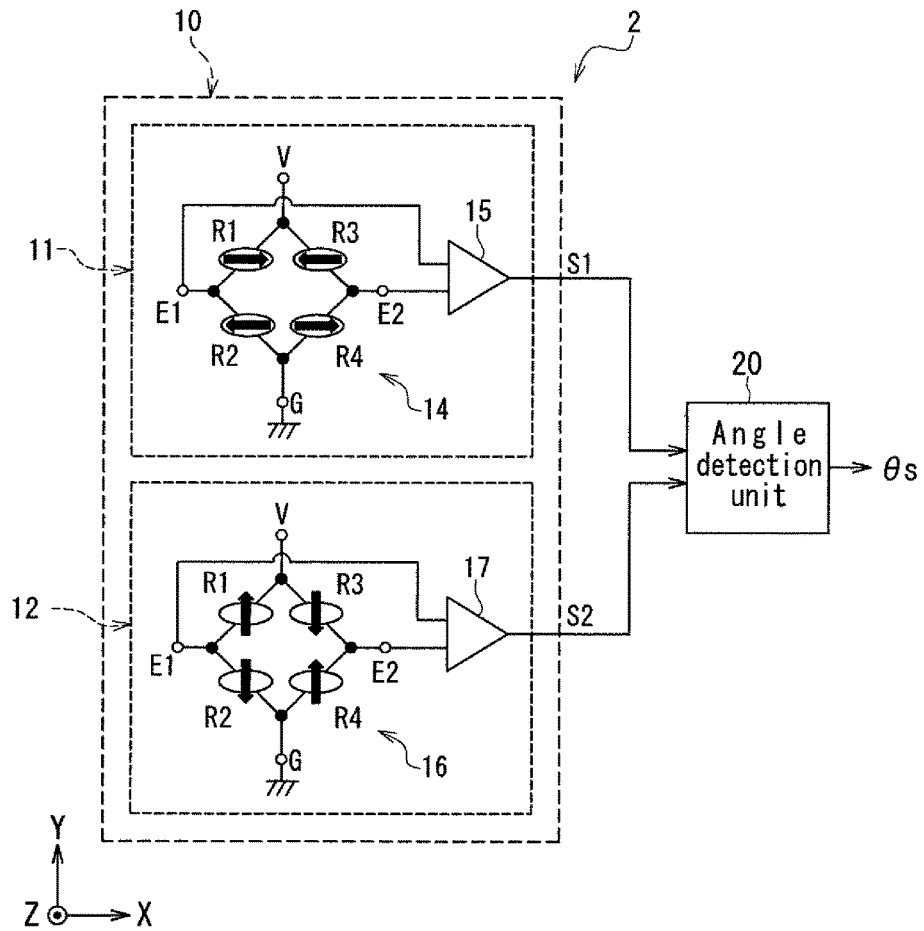
FIG. 4 is a circuit diagram illustrating the configuration of an angle sensor of the first embodiment of the invention.

The configuration of the detection unit 10 will now be described in detail with reference to FIG. 4. FIG. 4 is a circuit diagram illustrating the configuration of the angle sensor 2. The detection unit 10 includes a first detection signal generation unit 11 and a second detection signal generation unit 12.

The first detection signal generation unit 11 generates a first detection signal S1 having a correspondence with the cosine of the angle that the direction DM of the rotating magnetic field MF at the detection position PR forms with respect to the first direction D1. The second detection signal generation unit 12 generates a second detection signal S2 having a correspondence with the sine of the angle that the direction DM of the rotating magnetic field MF at the detection position PR forms with respect to the first direction D1. In the present embodiment, the first direction D1 is the same direction as the reference direction DR. Thus, the angle that the direction DM of the rotating magnetic field MF at the detection position PR forms with respect to the first direction D1 is equal to the rotating field angle θM.

The first detection signal generation unit 11 includes at least one first magnetic detection element for detecting the rotating magnetic field MF. The at least one first magnetic detection element includes a first magnetic layer whose magnetization direction varies according to the direction DM of the rotating magnetic field MF at the detection position PR. The first magnetic layer is provided with a first magnetic anisotropy.

The second detection signal generation unit 12 includes at least one second magnetic detection element for detecting the rotating magnetic field ME. The at least one second magnetic detection element includes a second magnetic layer whose magnetization direction varies according to the direction DM of the rotating magnetic field MF at the detection position PR. The second magnetic layer is provided with a second magnetic anisotropy.

Both of the first and second magnetic anisotropies are shape magnetic anisotropies, for example. The easy axis direction established by the first magnetic anisotropy and the easy axis direction established by the second magnetic anisotropy are the same.

The at least one first magnetic detection element and the at least one second magnetic detection element may each include at least one magnetoresistance element. The magnetoresistance element may be a giant magnetoresistance (GMR) element, a tunneling magnetoresistance (TMR) element, or an anisotropic magnetoresistance (AMR) element.

When the target angle θ varies with a predetermined period to cause the direction DM of the rotating magnetic field MF to vary with the predetermined period, each of the first and second detection signals S1 and S2 varies periodically with a signal period equal to the aforementioned predetermined period. The phase of the second detection signal S2 preferably differs from that of the first detection signal S1 by 90°. However, in the light of the production accuracy of the magnetic detection element and other factors, the phase difference between the first detection signal S1 and the second detection signal S2 can be slightly different from 90°. In the following description, the first detection signal S1 and the second detection signal S2 have a phase difference of 90°.

Reference is now made to FIG. 4 to describe an example of specific configuration of the first and second detection signal generation units 11 and 12. In this example, the first detection signal generation unit 11 includes a Wheatstone bridge circuit 14 and a difference detector 15. The second detection signal generation unit 12 includes a Wheatstone bridge circuit 16 and a difference detector 17.

Each of the Wheatstone bridge circuits 14 and 16 includes four magnetic detection elements R1, R2, R3 and R4, a power supply port V, a ground port G, a first output port E1, and a second output port E2. The magnetic detection element R1 is provided between the power supply port V and the first output port E1. The magnetic detection element R2 is provided between the first output port E1 and the ground port G. The magnetic detection element R3 is provided between the power supply port V and the second output port E2. The magnetic detection element R4 is provided between the second output port E2 and the ground port G. A power supply voltage of predetermined magnitude is applied to the power supply port V. The ground port G is grounded.

Each of the magnetic detection elements R1, R2, R3 and R4 may include a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies according to the direction DM of the rotating magnetic field MF at the detection position PR, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance according to the angle that the magnetization direction of the free layer forms with respect to the magnetization direction of the magnetization pinned layer, and has a minimum resistance when the foregoing angle is 0° and a maximum resistance when the foregoing angle is 180°. In FIG. 4, the filled arrows indicate the magnetization directions of the magnetization pinned layers of the MR elements.

In the first detection signal generation unit 11, the magnetization pinned layers of the MR elements included in the magnetic detection elements R1 and R4 are magnetized in the first direction D1 (the X direction), and the magnetization pinned layers of the MR elements included in the magnetic detection elements R2 and R3 are magnetized in the opposite direction to the first direction D1. In this case, the potential difference between the output ports E1 and E2 of the Wheatstone bridge circuit 14 varies according to the cosine of the rotating field angle θM. The difference detector 15 outputs a signal corresponding to the potential difference between the output ports E1 and E2 of the Wheatstone bridge circuit 14 as the first detection signal S1. The first detection signal generation unit 11 thus generates the first detection signal S1 having a correspondence with the cosine of the rotating field angle θM.

In the second detection signal generation unit 12, the magnetization pinned layers of the MR elements included in the magnetic detection elements R1 and R4 are magnetized in the second direction D2 (the Y direction), and the magnetization pinned layers of the MR elements included in the magnetic detection elements R2 and R3 are magnetized in the opposite direction to the second direction D2. In this case, the potential difference between the output ports E1 and E2 of the Wheatstone bridge circuit 16 varies according to the sine of the rotating field angle θM. The difference detector 17 outputs a signal corresponding to the potential difference between the output ports E1 and E2 of the Wheatstone bridge circuit 16 as the second detection signal S2. The second detection signal generation unit 12 thus generates the second detection signal S2 having a correspondence with the sine of the rotating field angle θM.

In the light of the production accuracy of the MR elements and other factors, the magnetization directions of the magnetization pinned layers of the plurality of MR elements in the detection signal generation units 11 and 12 may be slightly different from the above-described directions.

Each of the magnetic detection elements R1, R2, R3, and R4 in the first detection signal generation unit 11 includes at least one MR element including a free layer provided with the first magnetic anisotropy. The free layer provided with the first magnetic anisotropy corresponds to the first magnetic layer. In the present embodiment, in particular, the free layers of all the MR elements included in the first detection signal generation unit 11 are provided with the first magnetic anisotropy.

Each of the magnetic detection elements R1, R2, R3, and R4 in the second detection signal generation unit 12 includes at least one MR element including a free layer provided with the second magnetic anisotropy. The free layer provided with the second magnetic anisotropy corresponds to the second magnetic layer. In the present embodiment, in particular, the free layers of all the MR elements included in the second detection signal generation unit 12 are provided with the second magnetic anisotropy.

Now, a description will be given of the directions of the easy axes of magnetization resulting from the first and second magnetic anisotropies. In FIG. 4, the major axis direction of the ellipses representing the magnetic detection elements R1, R2, R3 and R4 of the first detection signal generation unit 11 corresponds to the easy axis to direction established by the first magnetic anisotropy. The major axis direction of the ellipses representing the magnetic detection elements R1, R2, R3 and R4 of the second detection signal generation unit 12 corresponds to the easy axis direction established by the second magnetic anisotropy.

The easy axis direction established by the first magnetic anisotropy and the easy axis direction established by the second magnetic anisotropy are both parallel to the X direction. The easy axis direction established by the first magnetic anisotropy is parallel to the magnetization directions of the magnetization pined layers of the MR elements included in the magnetic detection elements R1, R2, R3 and R4 of the first detection signal generation unit 11. The easy axis direction established by the second magnetic anisotropy is orthogonal to the magnetization directions of the magnetization pined layers of the MR elements included in the magnetic detection elements R1, R2, R3 and R4 of the second detection signal generation unit 12.

In the present embodiment, as mentioned previously, both of the first and second magnetic anisotropies are shape magnetic anisotropies, for example. In this case, forming the MR elements into a shape that is long in one direction, such as an elliptic shape, when viewed in a direction perpendicular to the interface between the free layer and the nonmagnetic layer, allows setting the first and second magnetic anisotropies such that the longitudinal direction of the MR elements coincides with the easy axis direction.

In the light of the production accuracy of the MR elements and other factors, the easy axis directions established by the first and second magnetic anisotropies may be slightly different from the above-specified directions.

In the present embodiment, the magnitudes of the first and second magnetic anisotropies are determined according to the error components contained in the first and second magnetic field components MF1 and MF2. This will be described in detail later.

Figure 5:
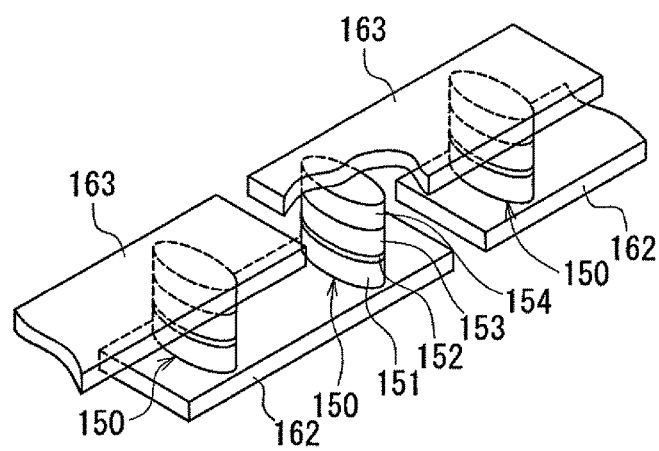
FIG. 5 is a perspective view of a portion of a magnetic detection element shown in FIG. 4.

An example configuration of the magnetic detection elements will now be described with reference to FIG. 5. FIG. 5 is a perspective view illustrating a portion of a magnetic detection element in the angle sensor 2 shown in FIG. 4. In this example, the magnetic detection element includes a plurality of lower electrodes 162, a plurality of MR elements 150 and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 5, MR elements 150 are provided on the top surfaces of the lower electrodes 162, near opposite ends in the longitudinal direction. Each of the MR elements 150 includes a free layer 151, a nonmagnetic layer 152, a magnetization pinned layer 153, and an antiferromagnetic layer 154 which are stacked in this order, the free layer 151 being closest to the lower electrode 162. The free layer 151 is electrically connected to the lower electrode 162. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 163 are arranged over the plurality of MR elements 150. Each of the upper electrodes 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, the plurality of MR elements 150 in the magnetic detection element shown in FIG. 5 are connected in series by the plurality of lower electrodes 162 and the plurality of upper electrodes 163. It should be appreciated that the layers 151 to 154 of the MR elements 150 may be stacked in the reverse order to that shown in FIG. 5.

In the example shown in FIG. 5, in order to provide the free layer 151 with the shape magnetic anisotropy described above, each MR element 150 is shaped to be elliptic when viewed in the direction perpendicular to the interface between the free layer 151 and the nonmagnetic layer 152.

The angle detection unit 20 will now be described. The angle detection unit 20 can be implemented by an application-specific integrated circuit (ASIC) or a microcomputer, for example. The angle detection unit 20 generates the detected angle value θs on the basis of the first and second detection signals S1 and S2. To be more specific, for example, the angle detection unit 20 calculates the detected angle value θs by the following Eq. (1). In Eq. (1), "a tan" represents are tangent.

$$\theta s = a\ \tan(S2/S1) \quad (1)$$

For θs within the range of 0° to less than 360°, Eq. (1) yields two solutions that are 180° different in value. Which of the two solutions for θs in Eq. (1) is the true value of θs can be determined from the combination of positive and negative signs of S1 and S2. The angle detection unit 20 determines θs within the range of 0° to less than 360° using Eq. (1) and the foregoing determination on the combination of positive and negative signs of S1 and S2.

The function and effects of the angle sensor system 1 according to the present embodiment will now be described. In the present embodiment, angular errors that can occur in the detected angle value θs include one associated with the rotating magnetic field MF and one associated with the angle sensor 2. In the present embodiment, the angular error associated with the angle sensor 2 results mainly from the first and second magnetic anisotropies. Note that the angular error corresponds to the detected angle value θs minus the target angle θ.

First, a description will be given of the angular error associated with the rotating magnetic field MF only. When the target angle θ varies with a predetermined period, each of the first magnetic field component MF1 and the second magnetic field component MF2 of the rotating magnetic field MF contains an ideal magnetic field component and an error magnetic field component, the ideal magnetic field component varying periodically in such a manner as to trace an ideal sinusoidal curve. In the present embodiment, the error magnetic field component is an error component corresponding to the third harmonic of the ideal magnetic field component. The ideal magnetic field component and the error magnetic field component of the first magnetic field component MF1 will be represented by MF10 and MF1a, respectively. The ideal magnetic field component and the error magnetic field component of the second magnetic field component MF2 will be represented by MF20 and MF2a, respectively. The error magnetic field components MF1a and MF2a of the first and second magnetic field components MF1 and MF2 cause an angular error Ea in the detected angle value θs, the angular error Ea varying with ½ the predetermined period.

Figure 6:
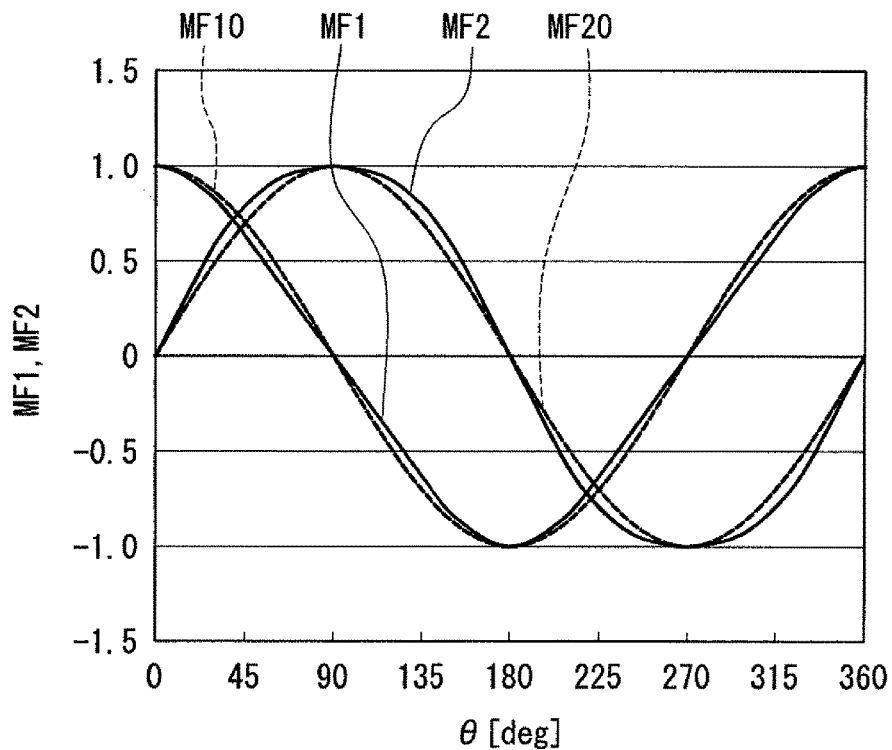
FIG. 6 is a waveform diagram illustrating an example of waveforms of first and second magnetic field components in the first embodiment of the invention.

FIG. 6 illustrates an example of waveforms of the first and second magnetic field components MF1 and MF2. In FIG. 6, the horizontal axis represents the target angle θ, and the vertical axis represents the first and second magnetic field components MF1 and MF2. The vertical axis of FIG. 6 is in arbitrary units with the maximum value of the ideal magnetic field components MF10 and MF20 of the first and second magnetic field components MF1 and MF2 as 1. In FIG. 6, the curve MF1 represents the waveform of the first magnetic field component MF1, and the curve MF2 represents the waveform of the second magnetic field component MF2. The curve MF10 represents the waveform of the ideal magnetic field component of the first magnetic field component MF1, and the curve MF20 represents the waveform of the ideal magnetic field component of the second magnetic field component MF2.

Figure 7:
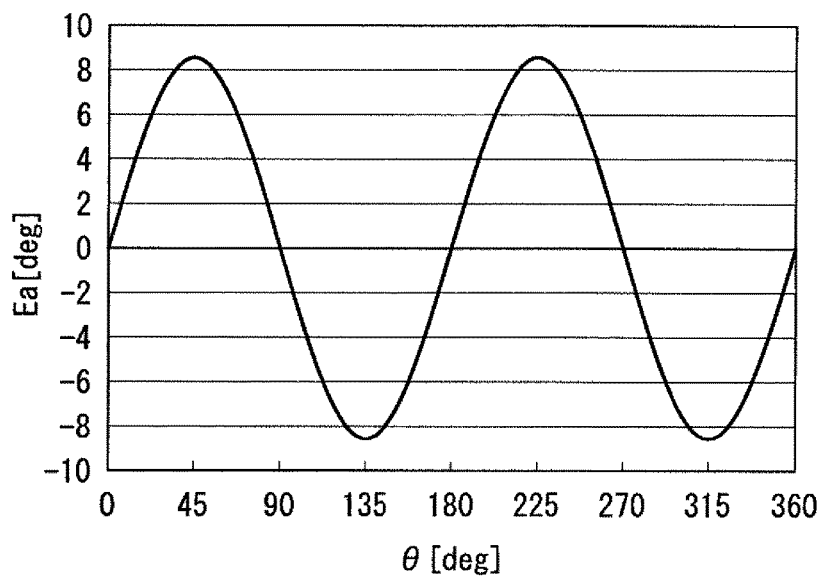
FIG. 7 is a waveform diagram illustrating the waveform of an angular error resulting from the first and second magnetic field components shown in FIG. 6.

FIG. 7 illustrates the waveform of the angular error Ea resulting from the first and second magnetic field components MF1 and MF2 shown in FIG. 6. In FIG. 7, the horizontal axis represents the target angle θ, and the vertical axis represents the angular error Ea.

The waveform of the ideal magnetic field component MF10 of the first magnetic field component MF1 shown in FIG. 6 can be represented by cos θ, and the waveform of the ideal magnetic field component MF20 of the second magnetic field component MF2 shown in FIG. 6 can be represented by sin θ. The waveform of the error magnetic field component MF1a of the first magnetic field component MF1 shown in FIG. 6 can be represented by $A_1 \cdot \cos 3\theta$, and the waveform of the error magnetic field component MF2a of the second magnetic field component MF2 shown in FIG. 6 can be represented by $A_1 \cdot \sin 3\theta$. Here, $A_1$ is a real number. In the example shown in FIG. 6, $A_1$ is a positive value.

Assuming that the angular error Ea is the only angular error occurring in the detected angle value θs, the first and second detection signals S1 and S2 can be represented by the following Eqs. (2) and (3), respectively.

$$S1 = \cos\theta + A_1 \cdot \cos 3\theta \quad (2)$$

$$S2 = \sin\theta + A_1 \cdot \sin 3\theta \quad (3)$$

Next, a description will be given of the angular error occurring in the detected angle value θs due to the first and second magnetic anisotropies. First, assume that the first and second magnetic field components MF1 and MF2 consist only of the ideal magnetic field components MF10 and MF20, respectively, when the target angle θ varies with a predetermined period. In such a case, each of the first and second detection signals S1 and S2 contains an ideal signal component and an error signal component, the ideal signal component varying periodically in such a manner as to trace an ideal sinusoidal curve. The ideal signal components of the first and second detection signals S1 and S2 will be represented by S10 and S20, respectively. The error signal components of the first and second detection signals S1 and S2 result from the first and second magnetic anisotropies, respectively. The error signal components of the first and second detection signals S1 and S2 cause an angular error Eb in the detected angle value θs, the angular error Eb varying with ½ the predetermined period.

Figure 8:
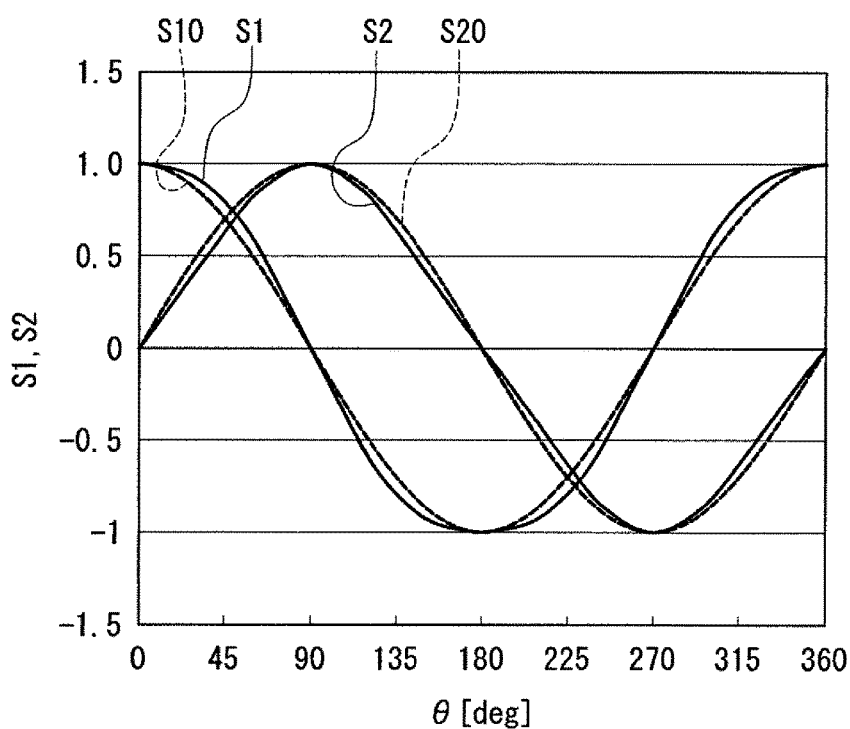
FIG. 8 is a waveform diagram illustrating an example of waveforms of first and second detection signals obtained with each of the first and second magnetic field components consisting only of an ideal magnetic field component in the first embodiment of the invention.

FIG. 8 illustrates an example of waveforms of the first and second detection signals S1 and S2 obtained on the assumption that the first and second magnetic field components MF1 and MF2 consist only of the ideal magnetic field components MF10 and MF20, respectively. In FIG. 8, the horizontal axis represents the target angle θ, and the vertical axis represents the first and second detection signals S1 and S2. In FIG. 8, the curve S1 represents the waveform of the first detection signal S1, and the curve S2 represents the waveform of the second detection signal S2. The curve S10 represents the waveform of the ideal signal component S10 of the first detection signal S1, and the curve S20 represents the waveform of the ideal signal component S20 of the second detection signal S2.

Figure 9:
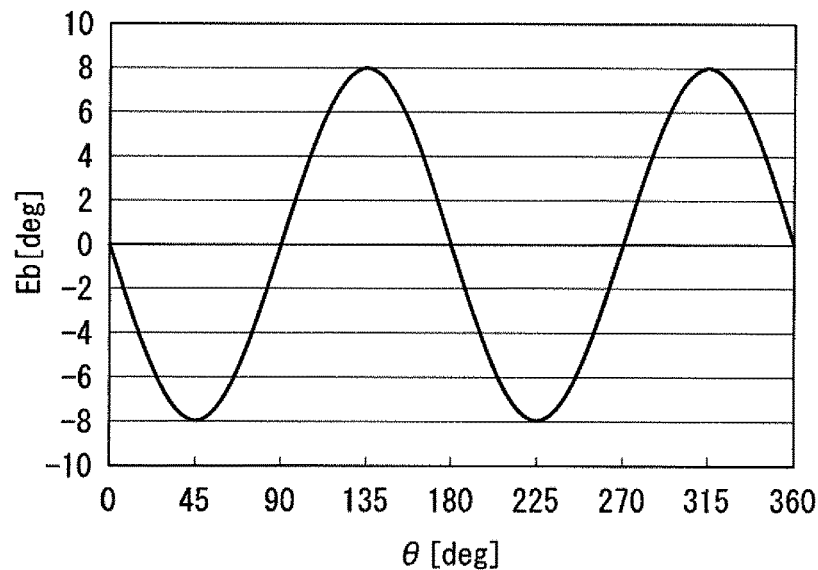
FIG. 9 is a waveform diagram illustrating the waveform of an angular error resulting only from error signal components of the first and second detection signals shown in FIG. 8.

FIG. 9 illustrates the waveform of the angular error Eb, which results only from the error signal components of the first and second detection signals S1 and S2 shown in FIG. 8. In FIG. 9, the horizontal axis represents the target angle θ, and the vertical axis represents the angular error Eb.

The waveform of the ideal signal component S10 of the first detection signal S1 shown in FIG. 8 can be represented by cos θ, and the waveform of the ideal signal component S20 of the second detection signal S2 shown in FIG. 8 can be represented by sin θ. The error signal component of the first detection signal S1 shown in FIG. 8 can be represented by $-B_1 \cdot \cos 3\theta$, and the error signal component of the second detection signal S2 shown in FIG. 8 can be represented by $-B_1 \sin 3\theta$. Here, $B_1$ is a real number. In the example shown in FIG. 8, $B_1$ is a positive value.

As shown in FIG. 9, the angular error Eb resulting only from the error signal components of the first and second detection signals S1 and S2 varies with ½ the predetermined period. As mentioned above, the angular error Ea resulting only from the error magnetic field components MF1a and MF2a of the first and second magnetic field components MF1 and MF2 also varies with ½ the predetermined period. When $B_1$ and $A_1$ have the same positive or negative sign, the angular error Ea and the angular error Eb have a phase difference of 90°. In particular, when $B_1$ and $A_1$ are equal to each other, the angular error Ea and the angular error Eb have a phase difference of 90° and have the same amplitude. When the angular error Ea and the angular error Eb have such a relationship, any angular error that varies with ½ the predetermined period can be completely reduced to 0, in theory, in the detected angle value θs.

The positive or negative sign of $B_1$ can be changed by changing the easy axis directions to be established by the first and second magnetic anisotropies. For example, in the configuration shown in FIG. 4, $B_1$ is a positive value. Another configuration that makes $B_1$ a negative value will be described later in relation to a third embodiment. The absolute value of $B_1$ can be changed by changing the magnitudes of the first and second magnetic anisotropies.

The present embodiment takes advantage of the above-described characteristic to reduce the the angular error Ea resulting from the error magnetic field components MF1a and MF2a of the first and second magnetic field components MF1 and MF2, using the first and second magnetic anisotropies as follows. Specifically, in the present embodiment, the first and second magnetic anisotropies are set to allow the detected angle value θs to contain a reduced angular error that varies with ½ the predetermined period, as compared with both of the angular error Ea and the angular error Eb.

Figure 10:
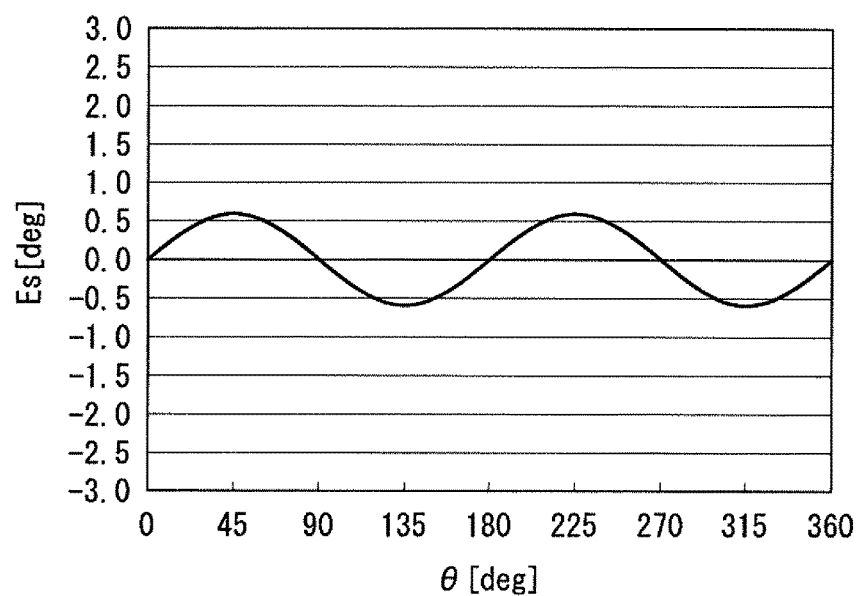
FIG. 10 is a waveform diagram illustrating an example of the waveform of an angular error in the first embodiment of the invention.

Here, the angular error of the detected angle value θs will be represented by symbol Es. FIG. 10 illustrates an example of the waveform of the angular error Es. In FIG. 10, the horizontal axis represents the target angle θ, and the vertical axis represents the angular error Es.

In the angular error Es shown in FIG. 10, the angular error component varying with ½ the predetermined period is smaller than both of the angular error Ea shown in FIG. 7 and the angular error Eb shown in FIG. 9. This shows that the present embodiment enables reducing the angular error Ea resulting from the error magnetic field components MF1a and MF2a of the first and second magnetic field components MF1 and MF2 by using the first and second magnetic anisotropies.

Now, an example method for determining $B_1$ and the easy axis directions and the magnitudes of the first and second magnetic anisotropies will be described. First, the waveform of the angular error Ea is determined by $A_1$. $A_1$ is thus obtainable from the waveform of the angular error Ea.

In order for the detected angle value θs to contain a reduced angular error that varies with ½ the predetermined period as compared with both of the angular error Ea and the angular error Eb, $B_1$ is determined so as to have the same positive or negative sign as $A_1$, and to make the absolute value of $(A_1-B_1)$ smaller than the absolute value of $A_1$. The smaller the absolute value of $(A_1-B_1)$ is, the more preferable it is. The absolute value of $(A_1-B_1)$ is preferably smaller than or equal to ½ the absolute value of $A_1$.

As mentioned previously, the positive or negative sign of $B_1$ can be changed by changing the easy axis directions to be established by the first and second magnetic anisotropies. The absolute value of $B_1$ has relation to the magnitudes of the first and second magnetic anisotropies. By obtaining, in advance, the relationships between $B_1$ and the easy axis directions and the magnitudes of the first and second magnetic anisotropies, it is possible to determine the easy axis directions and the magnitudes of the first and second magnetic anisotropies on the basis of the obtained relationships to achieve a desired value of $B_1$.

From the foregoing, the present embodiment enables reduction of the angular error associated with the rotating magnetic field MF generated by the magnetic field generation unit. In the present embodiment, the angle sensor 2 does not require a plurality of pairs of detection signal generation units 11 and 12, but requires only one pair of detection signal generation units 11 and 12. The present embodiment thus enables reduction of the angular error associated with the rotating magnetic field MF generated by the magnetic field generation unit, without complexity in configuration.

Second Embodiment

A second embodiment of the present invention will now be described with reference to FIG. 11 to FIG. 14. FIG. 11 to FIG. 14 respectively illustrate first to fourth states of the angle sensor system 1 according to the second embodiment.

The angle sensor system 1 according to the second embodiment differs from the first embodiment in the following ways. The magnetic field generation unit of the angle sensor system 1 according to the second embodiment is a magnet 8 different from the magnet 5 of the first embodiment. The magnet 8 includes a plurality of pairs of N and S poles arranged alternately in the first direction. The first direction is the X direction.

In FIG. 11 to FIG. 14, the X direction is rightward, the Y direction is upward, and the Z direction is out of the plane of the drawing. The magnet 8 has a side surface 8a parallel to the X direction. In the present embodiment, the detection unit 10 of the angle sensor 2 is situated to face the side surface 8a of the magnet 8. FIG. 11 to FIG. 14 illustrate a plurality of curves near the side surface 8a of the magnet 8, the plurality of curves representing magnetic lines of force.

Either the angle sensor 2 or the magnet 8 is movable linearly in a direction DL parallel to the first direction (the X direction) in response to the movement of a moving body (not illustrated). In other words, the relative position of the magnet 8 with respect to the detection position PR is variable in the first direction (the X direction). In the example shown in FIG. 11, the direction DL is the X direction.

The reference plane in the present embodiment is perpendicular to the Z direction. As the relative position of the magnet 8 with respect to the detection position PR moves in the direction DL, the direction DM of the rotating magnetic field MF rotates counterclockwise in FIG. 11. The target angle θ and the rotating field angle θM will be expressed in positive values when seen counterclockwise from the reference direction DR, and in negative values when seen clockwise from the reference direction DR. The definitions of the first direction D1, the second direction D2, the first magnetic field component MF1 and the second magnetic field component MF2 are the same as those in the first embodiment.

The angle sensor 2 detects the rotating magnetic field MF at the detection position PR and generates the detected angle value θs having a correspondence with the target angle θ. In the present embodiment, the target angle θ is an angle that represents the relative position of the magnet 8 with respect to the detection position PR with one pitch of the magnet 8 as 360°.

Figure 11:
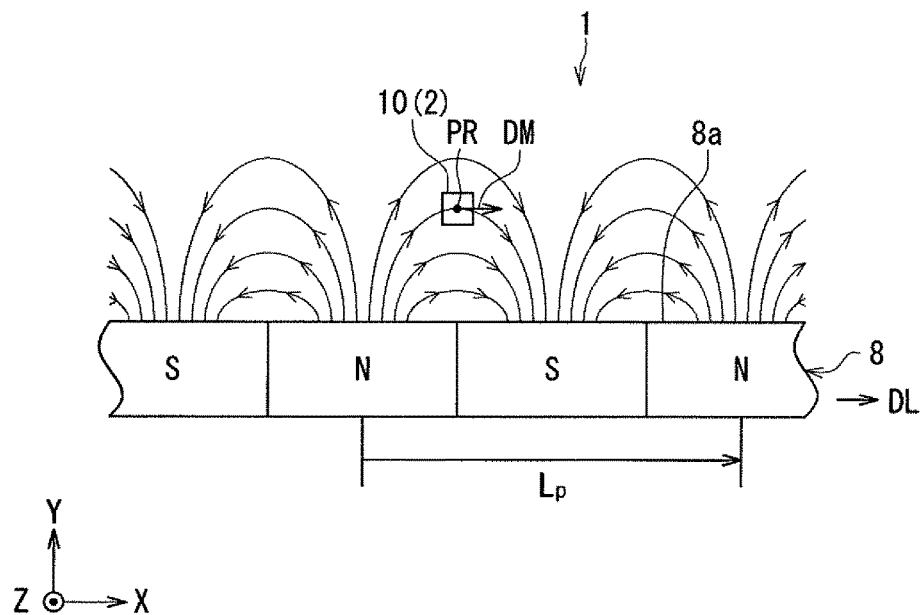
FIG. 11 is an explanatory diagram illustrating a first state of an angle sensor system according to a second embodiment of the invention.

In the first state shown in FIG. 11, the detection position PR is situated in an imaginary plane including the boundary between neighboring N and S poles of the magnet 8. In the first state, the target angle θ is 0°.

Figure 12:
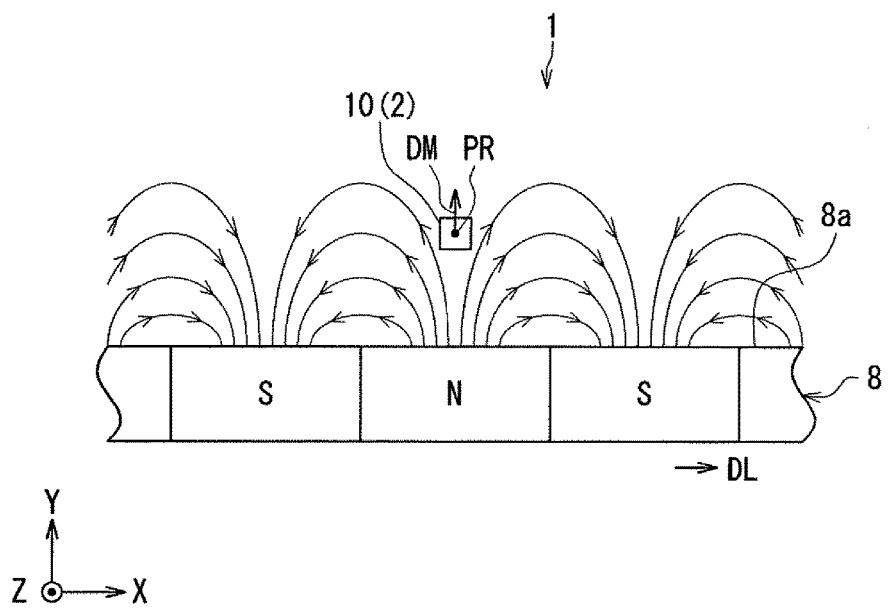
FIG. 12 is an explanatory diagram illustrating a second state of the angle sensor system according to the second embodiment of the invention.

The second state shown in FIG. 12 is where the magnet 8 has moved by ¼ pitch from the first state in the direction DL. In the second state, the target angle θ is 90°.

Figure 13:
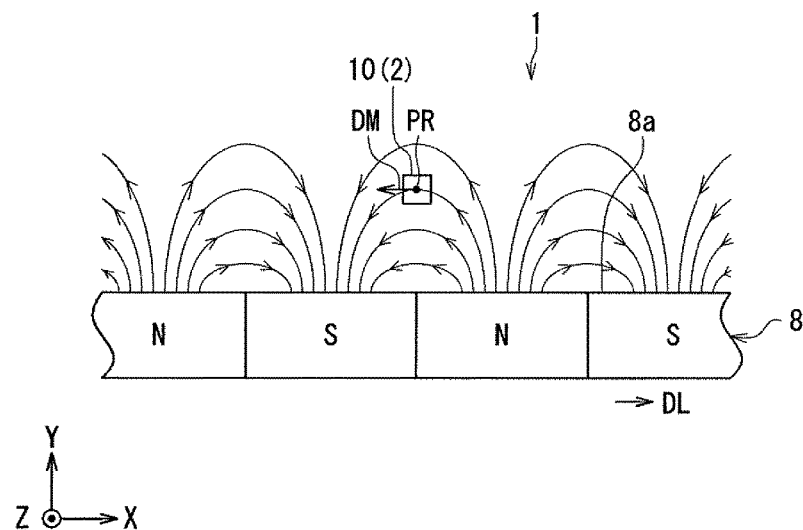
FIG. 13 is an explanatory diagram illustrating a third state of the angle sensor system according to the second embodiment of the invention.

The third state shown in FIG. 13 is where the magnet 8 has moved by ¼ pitch from the second state in the direction DL. In the third state, the target angle θ is 180°.

Figure 14:
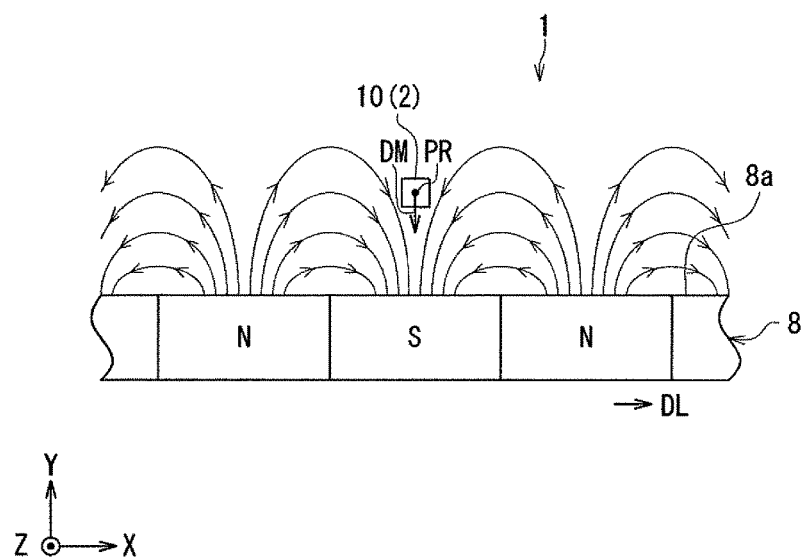
FIG. 14 is an explanatory diagram illustrating a fourth state of the angle sensor system according to the second embodiment of the invention.

The fourth state shown in FIG. 14 is where the magnet 8 has moved by ¼ pitch from the third state in the direction DL. In the fourth state, the target angle θ is 270°.

A movement of the magnet 8 by ¼ pitch from the fourth state in the direction DL brings about the first state shown in FIG. 11.

In the present embodiment, when the target angle θ varies with a predetermined period, each of the first magnetic field component MF1 and the second magnetic field component MF2 of the rotating magnetic field MF contains the ideal magnetic field component and the error magnetic field component, as in the first embodiment.

The angle sensor 2 according to the present embodiment has the same configuration as that in the first embodiment. The other configuration, function and effects of the present embodiment are the same as those of the first embodiment.

Third Embodiment

Figure 15:
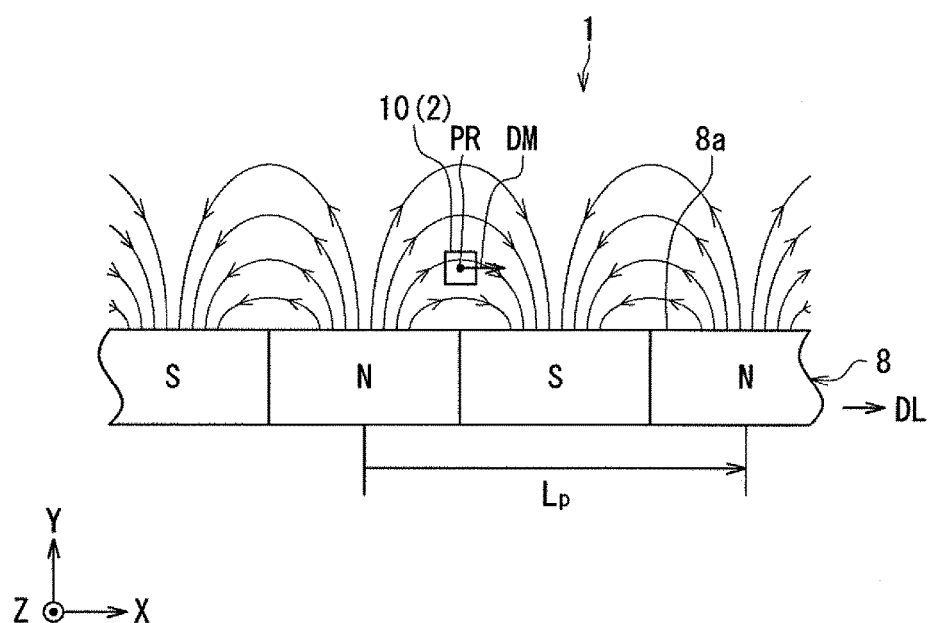
FIG. 15 is an explanatory diagram illustrating a general configuration of an angle sensor system according to a third embodiment of the invention.

A third embodiment of the present invention will now be described. FIG. 15 is an explanatory diagram illustrating the general configuration of an angle sensor system according to the third embodiment. In the angle sensor system 1 according to the third embodiment, the angle sensor 2 is located closer to the side surface 8a of the magnet 8 than in the second embodiment.

Figure 16:
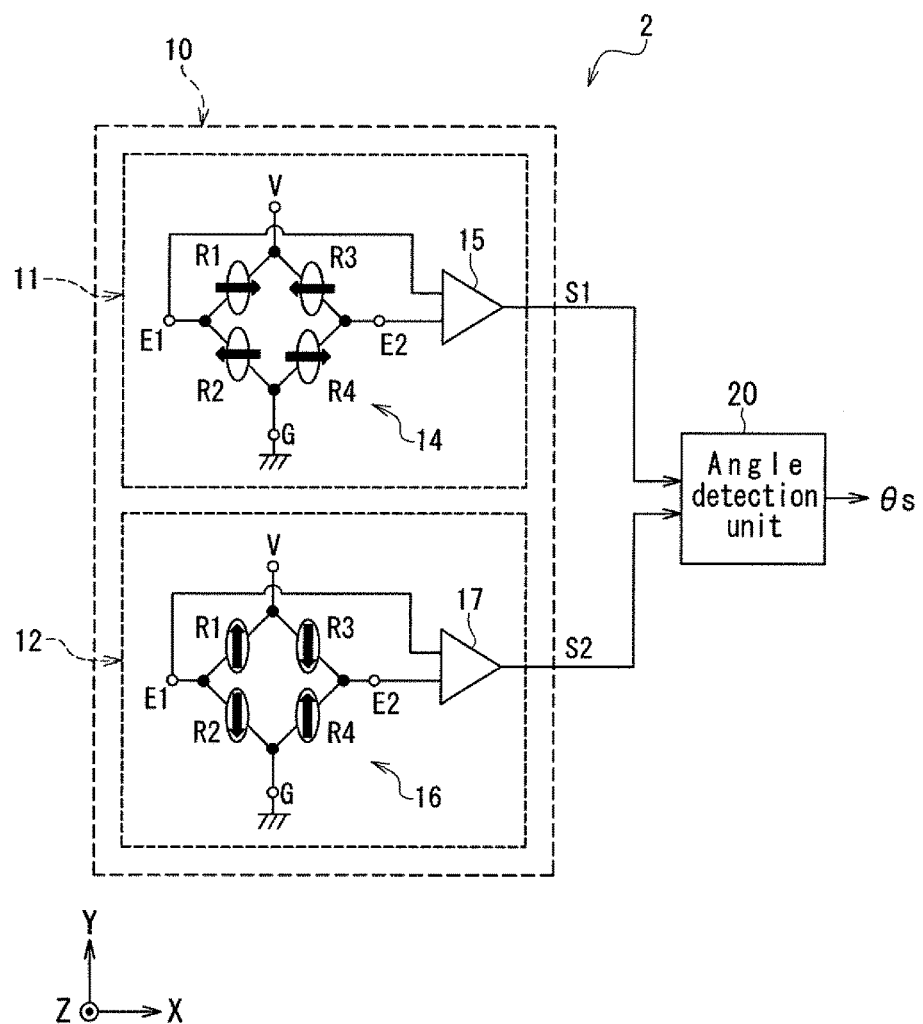
FIG. 16 is a circuit diagram illustrating the configuration of an angle sensor of the third embodiment of the invention.

FIG. 16 is a circuit diagram illustrating the configuration of the angle sensor 2 of the present embodiment. In the present embodiment, as in the second embodiment (the first embodiment), the free layers of all the MR elements included in the first detection signal generation unit 11 are provided with the first magnetic anisotropy, and the free layers of all the MR elements included in the second detection signal generation unit 12 are provided with the second magnetic anisotropy. In FIG. 16, the major axis direction of the ellipses representing the magnetic detection elements R1, R2, R3 and R4 of the first detection signal generation unit 11 corresponds to the easy axis direction established by the first magnetic anisotropy. The major axis direction of the ellipses representing the magnetic detection elements R1, R2, R3 and R4 of the second detection signal generation unit 12 corresponds to the easy axis direction established by the second magnetic anisotropy.

In the present embodiment, the easy axis direction established by the first magnetic anisotropy and the easy axis direction established by the second magnetic anisotropy are both parallel to the Y direction. The easy axis direction established by the first magnetic anisotropy is orthogonal to the magnetization directions of the magnetization pinned layers of the MR elements included in the magnetic detection elements R1, R2, R3 and R4 in the first detection signal generation unit 11. The easy axis direction established by the second magnetic anisotropy is parallel to the magnetization directions of the magnetization pinned layers of the MR elements included in the magnetic detection elements R1, R2, R3 and R4 in the second detection signal generation unit 12.

The function and effects of the angle sensor system 1 according to the present embodiment will now be described. As has been described in relation to the first embodiment, the error magnetic field components MF1a and MF2a of the first and second magnetic field components MF1 and MF2 cause the angular error Ea, which varies with ½ the predetermined period, in the detected angle value θs. When the waveforms of the ideal magnetic field components MF10 and MF20 of the first and second magnetic field components MF1 and MF2 are the same as those in the first embodiment shown in FIG. 6, the waveform of the error magnetic field component MF1a of the first magnetic field component MF1 can be represented by $A_1 \cdot \cos 3\theta$, and the waveform of the error magnetic field component MF2a of the second magnetic field component MF2 can be represented by $A_1 \cdot \sin 3\theta$. In the present embodiment, in particular, $A_1$ is a negative value.

Figure 17:
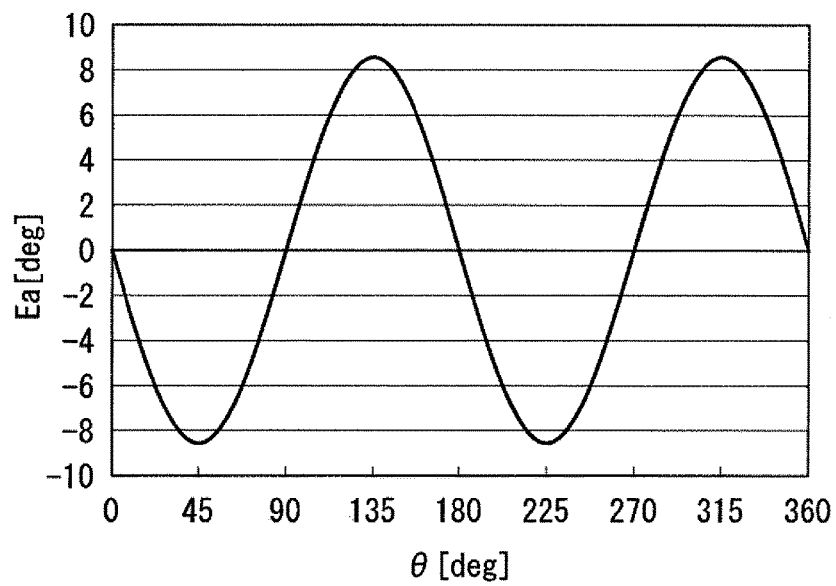
FIG. 17 is a waveform diagram illustrating the waveform of an angular error resulting from the first and second magnetic field components in the third embodiment of the invention.

FIG. 17 illustrates the waveform of the angular error Ea resulting from the first and second magnetic field components MF1 and MF2. In FIG. 17, the horizontal axis represents the target angle θ, and the vertical axis represents the angular error Ea. In the present embodiment, the phase of the angular error Ea is opposite to that in the first embodiment.

As has been described in relation to the first embodiment, the error signal components of the first and second detection signals S1 and S2 cause the angular error Eb, which varies with ½ the predetermined period, in the detected angle value θs. Assume here that the first and second magnetic field components MF1 and MF2 consist only of the ideal magnetic field components MF10 and MF20, respectively. In such a case, if the waveforms of the ideal signal components S10 and S20 of the first and second detection signals S1 and S2 are the same as those in the first embodiment shown in FIG. 8, the error signal component of the first detection signal S1 can be represented by $-B_1 \cos 3\theta$, and the error signal component of the second detection signal S2 can be represented by $-B_1 \sin 3\theta$. In the present embodiment, in particular, $B_1$ is a negative value.

Figure 18:
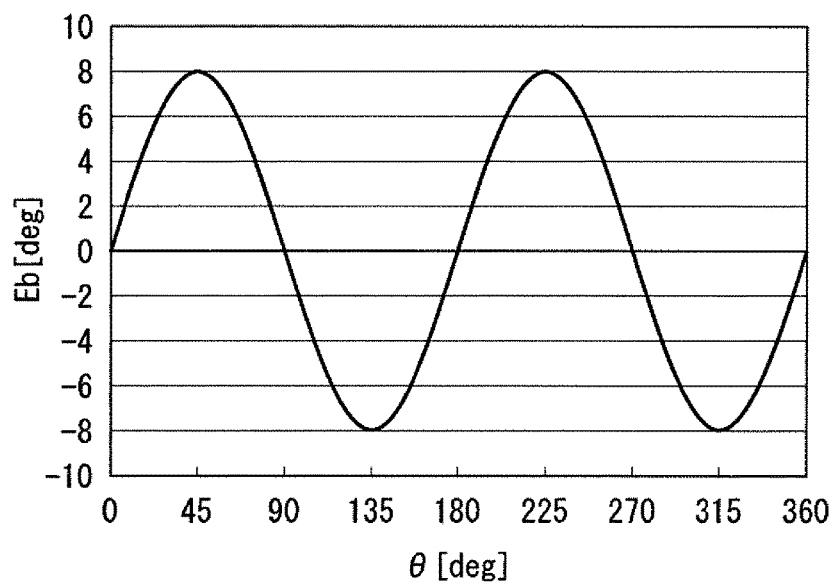
FIG. 18 is a waveform diagram illustrating the waveform of an angular error resulting only from the error signal components of the first and second detection signals in the third embodiment of the invention.

FIG. 18 illustrates the waveform of the angular error Eb resulting only from the error signal components of the first and second detection signals S1 and S2 in the foregoing case. In FIG. 18, the horizontal axis represents the target angle θ, and the vertical axis represents the angular error Eb. In the present embodiment, the phase of the angular error Eb is opposite to that in the first embodiment.

Figure 19:
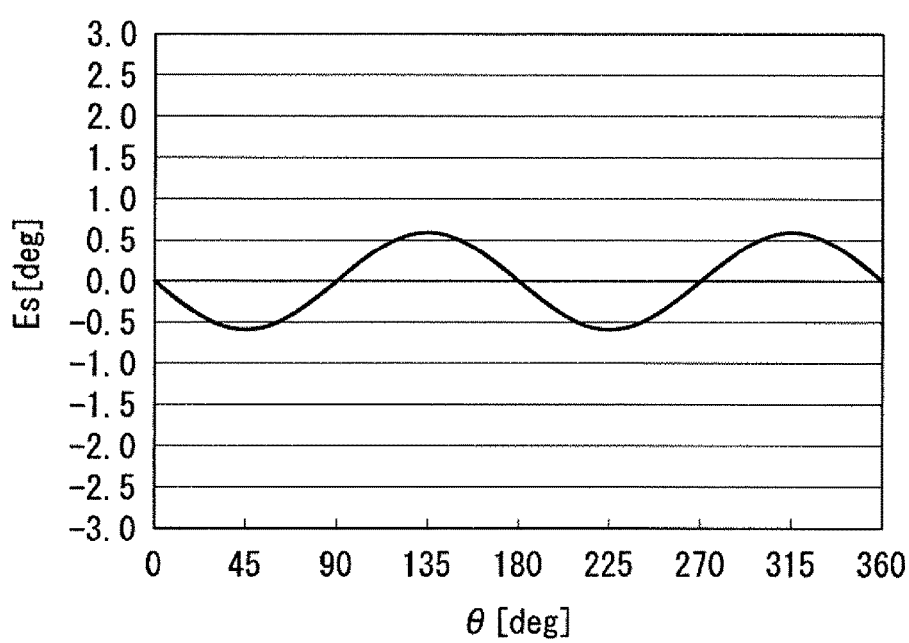
FIG. 19 is a waveform diagram illustrating an example of the waveform of an angular error in the third embodiment of the invention.

As shown in FIG. 17 and FIG. 18, the angular error Ea and the angular error Eb have a phase difference of 90°. In the present embodiment, it is thus possible to reduce the angular error Ea resulting from the error magnetic field components MF1a and MF2a of the first and second magnetic field components MF1 and MF2 by using the first and second magnetic anisotropies, as in the first and second embodiments. FIG. 19 illustrates an example of the waveform of the angular error Es of the detected angle value θs. In FIG. 19 the horizontal axis represents the target angle θ, and the vertical axis represents the angular error Es.

In the angular error Es shown in FIG. 19, the angular error component varying with ½ the predetermined period is smaller than both of the angular error Ea shown in FIG. 17 and the angular error Eb shown in FIG. 18. This shows that the present embodiment enables reducing the angular error Ea resulting from the error magnetic field components MF1a and MF2a of the first and second magnetic field components MF1 and MF2 by using the first and second Magnetic anisotropies.

The other configuration, function and effects of the present embodiment are the same as those of the second embodiment.

The present invention is not limited to the foregoing embodiments, and various modifications may be made thereto. For example, the magnetic detection elements in the present invention are not limited to spin-valve MR elements (GMR and TMR elements) or AMR elements, and may be any magnetic detection elements that have a magnetic layer whose magnetization direction varies according to the direction of a rotating magnetic field. For example, Hall elements each including a ferromagnetic layer and using ferromagnetic Hall effects may be used as the magnetic detection elements.

The magnetic anisotropy provided to the magnetic layer is not limited to shape magnetic anisotropy, and may be magnetocrystalline anisotropy or stress-induced magnetic anisotropy.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. An angle sensor system comprising;
    a magnetic field generation unit for generating a rotating magnetic field whose direction at a predetermined detection position varies according to an angle to be detected; and
    an angle sensor for detecting the rotating magnetic field at the detection position and generating a detected angle *value having a correspondence with the angle to be detected, wherein
    the rotating magnetic field at the detection position contains a first magnetic field component in a first direction, and a second magnetic field component in a second direction orthogonal to the first direction,
    the angle sensor includes:
        a first detection signal generation unit for generating a first detection signal having a correspondence with the cosine of an angle that the direction of the rotating magnetic field at the detection position forms with respect to the first direction;
        a second detection signal generation unit for generating a second detection signal having a correspondence with the sine of the angle that the direction of the rotating magnetic field at the detection position forms with respect to the first direction; and
        an angle detection unit for generating the detected angle value on the basis of the first and second detection signals, the first detection signal generation unit includes at least one first magnetic detection element, the at least one first magnetic detection element includes a first magnetic layer whose magnetization direction varies according to the direction of the rotating magnetic field at the detection position, the first magnetic layer is provided with a first magnetic anisotropy, the second detection signal generation unit includes at least one second magnetic detection element, the at least one second magnetic detection element includes a second magnetic layer whose magnetization direction varies according to the direction of the rotating magnetic field at the detection position, the second magnetic layer is provided with a second magnetic anisotropy, when the angle to be detected varies with a predetermined period, each of the first and second magnetic field components contains an ideal magnetic field component and an error magnetic field component, the ideal magnetic field component varying periodically in such a manner as to trace an ideal sinusoidal curve, the error magnetic field component causes an error that varies with ½ the predetermined period in the detected angle value, assuming that each of the first and second magnetic field components consists only of the ideal magnetic field component when the angle to be detected varies with the predetermined period, each of the first and second detection signals contains an ideal signal component and an error signal component, the ideal signal component varying periodically in such a manner as to trace an ideal sinusoidal curve, the error signal component results from the first and second magnetic anisotropies, and causes an error that varies with ½ the predetermined period in the detected angle value, and the first and second magnetic anisotropies are set to allow the detected angle value to contain a reduced error that varies with ½ the predetermined period, as compared with both of the error that the error magnetic field component causes in the detected angle value and the error that the error signal component causes in the detected angle value.

2. The angle sensor system according to claim 1, wherein the error that the error magnetic field component causes in the detected angle value and the error that the error signal component causes in the detected angle value have a phase difference of 90°.

3. The angle sensor system according to claim 1, wherein both of the first and second magnetic anisotropies are shape magnetic anisotropies.

4. The angle sensor system according to claim 1, wherein an easy axis direction established by the first magnetic anisotropy and an easy axis direction established by the second magnetic anisotropy are the same.

5. The angle sensor system according to claim 1, wherein the at least one first magnetic detection element and the at least one second magnetic detection element each include at least one magnetoresistance element.

6. The angle sensor system according to claim 1, wherein the magnetic field generation unit is a magnet that is rotatable about a central axis,
the detection position is located off the central axis, and
the angle to be detected corresponds to a rotational position of the magnet.

7. The angle sensor system according to claim 1, wherein the magnetic field generation unit is a magnet including a plurality of pairs of N and S poles arranged alternately in the first direction,
a relative position of the magnet with respect to the detection position is variable in the first direction, and
the angle to be detected is an angle that represents the relative position of the magnet with respect to the detection position with one pitch of the magnet as 360°.

* * * * *